US007340814B2

(12) United States Patent
Bruehwiler et al.

(10) Patent No.: US 7,340,814 B2
(45) Date of Patent: Mar. 11, 2008

(54) METHOD OF INSTALLING SPIRAL THREADED INSERTS AND INSTALLATION TOOL

(75) Inventors: Eduard Bruehwiler, Turgi (CH); Graham Christopher Young, Wettingen (CH)

(73) Assignee: ALSTOM Technology Ltd., Baden (CH)

( * ) Notice: Subject to any disclaimer, the term of this patent is extended or adjusted under 35 U.S.C. 154(b) by 302 days.

(21) Appl. No.: 10/775,125

(22) Filed: Feb. 11, 2004

(65) Prior Publication Data

US 2004/0187288 A1 Sep. 30, 2004

(30) Foreign Application Priority Data

Feb. 13, 2003 (DE) ................................ 103 05 898

(51) Int. Cl.
*B23Q 17/00* (2006.01)
*B23P 19/00* (2006.01)
*B23P 19/04* (2006.01)
*B21D 39/00* (2006.01)

(52) U.S. Cl. .............................. 29/407.04; 29/407.09; 29/407.1; 29/456; 29/720; 29/240.5

(58) Field of Classification Search ............... 29/889.2, 29/402.01, 402.04, 402.08, 402.09, 402.15, 29/402.17, 525.11, 407.04, 407.09, 407.1, 29/720, 721, 456, 240, 240.5, 243, 244; 81/57.33
See application file for complete search history.

(56) References Cited

U.S. PATENT DOCUMENTS 1,009,248 A * 11/1911 Jenkins et al. ................ 29/240
2,210,061 A * 8/1940 Caminez .................... 29/240.5
2,316,231 A * 4/1943 Evans ........................ 29/240.5
2,390,524 A * 12/1945 Eckener ...................... 29/240.5
2,390,545 A * 12/1945 Lang .......................... 29/240.5
2,453,840 A * 11/1948 Geertsema ................. 29/240.5
2,584,118 A * 2/1952 Forster ....................... 29/240.5
2,855,661 A * 10/1958 Forster ....................... 29/240.5
3,052,972 A * 9/1962 Steinmeyer ................ 29/240.5
3,152,495 A * 10/1964 Neuschotz .................. 81/53.2
3,481,022 A * 12/1969 Neuschotz ................... 29/456
3,545,066 A * 12/1970 Stillman et al. ............. 29/240
4,172,314 A * 10/1979 Berecz et al. ............. 29/240.5

(Continued)

FOREIGN PATENT DOCUMENTS

CH 256047 2/1949

(Continued)

OTHER PUBLICATIONS

Search Report from DE 103 05 898.2 (Feb. 13, 2003).

(Continued)

*Primary Examiner*—Jermie E. Cozart
(74) *Attorney, Agent, or Firm*—Cermak Kenealy & Vaidya LLP; Adam J. Cermak

(57) ABSTRACT

In a method of installing spiral threaded inserts (38), in which method a first threaded insert (38) is inserted into an installation tool (20) and is screwed into a tapped hole by the installation tool (20), safe use is achieved even at locations where access is difficult by virtue of the fact that the first threaded insert (38) is secured in the installation tool (20) to prevent it from falling out.

24 Claims, 5 Drawing Sheets

U.S. PATENT DOCUMENTS

| | | | | |
|---|---|---|---|---|
| 4,227,290 | A | 10/1980 | Wallace | 29/240.5 |
| 4,553,302 | A * | 11/1985 | Cosenza et al. | 29/240.5 |
| 4,768,270 | A * | 9/1988 | Czarnowski | 29/240.5 |
| 4,980,959 | A * | 1/1991 | Czarnowski | 29/240.5 |
| 5,212,865 | A * | 5/1993 | Davis et al. | 29/240.5 |
| 6,000,114 | A * | 12/1999 | Newton et al. | 29/240.5 |
| 6,321,433 | B1 | 11/2001 | Cliff et al. | 29/240.5 |
| 6,367,138 | B1 * | 4/2002 | Newton et al. | 29/240.5 |
| 6,860,173 | B2 * | 3/2005 | Newton et al. | 81/57.11 |

FOREIGN PATENT DOCUMENTS

| | | |
|---|---|---|
| DE | GE 829 128 | 1/1952 |
| DE | 100 64 269 | 7/2002 |
| EP | 0 318 726 | 11/1988 |
| EP | 1 078 719 | 2/2001 |
| EP | 1 084 800 | 3/2001 |
| EP | 1 132 174 | 9/2001 |
| GB | 565418 | 5/1943 |
| GB | 637340 | 5/1950 |
| GB | 842342 | 7/1960 |
| GB | 2 150 476 | 7/1985 |

OTHER PUBLICATIONS

Search Report from GB 0403271.0.

* cited by examiner

METHOD OF INSTALLING SPIRAL THREADED INSERTS AND INSTALLATION TOOL

TECHNICAL FIELD

The present invention relates to the field of mechanical engineering. It relates to a method of installing spiral threaded inserts according to the preamble of claim 1. It also relates to an installation tool for carrying out the method.

PRIOR ART

Large industrial gas turbines require regular inspections of internal plant parts in order to ensure reliable and efficient operation. Access to the internal plant parts is possible through inspection ports which are provided at various locations of the gas turbine and are sealed with sealing plugs. The sealing plugs are screwed into holes, provided with spiral threaded inserts, in the large inner part of the gas turbine. A known system of such spiral threaded inserts is offered on the market by the American company Emhart Teknologies under the trade name "Helicoil®". When the sealing plugs are removed, the threaded inserts are often damaged or are partly unscrewed and therefore have to be replaced. However, the replacement of threaded inserts which are located in the interior of the main casings of gas turbines was only possible with the previous means if the main casings were opened during a main inspection.

DESCRIPTION OF THE INVENTION

The object of the invention is to specify a method with which spiral threaded inserts of the Helicoil® type inserts can be installed through narrow inspection ports in a simple and reliable manner, and to provide an installation tool for carrying out such a method.

This object is achieved by all the features of claims 1 and 7 in their entirety. The essence of the invention consists in securing the threaded insert to be installed in the installation tool to prevent it from falling out. As a result, the threaded insert can also be installed at locations where access is difficult.

A preferred refinement of the method according to the invention is distinguished in that the threaded inserts in each case have a driving tang, in that the first threaded insert is secured in the installation tool on the driving tang to prevent it from falling out, in that the driving tang is cut off from the first threaded insert after the installation of the first threaded insert, in that a securing thread which is fastened to the driving tang is used for securing the first threaded insert in the installation tool, and in that the cut-off driving tang is removed from the installed first threaded insert by means of the securing thread. Several problems are thereby solved simultaneously with simple means.

Simple and reliable positioning of the threaded insert on the tool with regard to the installation is achieved in that the first threaded insert is brought into a predetermined installation position during the insertion into the installation tool, a second threaded insert being firmly arranged in the installation tool, the first threaded insert to be installed being oriented, during the insertion into the installation tool, at said second threaded insert relative to the predetermined installation position.

Furthermore, the installation is facilitated if the installation of the first threaded inserts is effected through inspection ports, and the installation operation is monitored optically, in particular by means of a borescope.

A preferred embodiment of the installation tool according to the invention is distinguished in that the first means comprise a head having an elongated circular-cylindrical bolt, which bolt has, at the front end, a slotted section for pushing the first threaded insert over it, in that, below the slotted section, the bolt is enclosed concentrically by a hollow-cylindrical mounting sleeve at a distance apart, and in that the mounting sleeve has an internal thread, into which a second threaded insert is firmly screwed in such a way that the first threaded insert pushed over the slotted section abuts at the end face against the second threaded insert and is oriented at the second threaded insert.

A further preferred embodiment of the installation tool according to the invention is characterized in that the second means comprise a securing thread which is passed through the installation tool in the longitudinal direction, is led out of the installation tool at the front end of the installation tool and can be connected to the first threaded insert.

In particular, the securing thread is made of a tear-resistant material, preferably nylon®, and has a diameter of a few 1/10 mm, preferably about 0.4 mm.

The shaft is preferably composed of a plurality of tubular sections which are arranged one behind the other and are releasably connected to one another, a slot-shaped opening extending in the longitudinal direction being provided in the foremost section, through which slot-shaped opening a borescope running inside the shaft can be passed outward, and a supporting tube for supporting the borescope projecting from the shaft being arranged on the outside of the foremost section in front of the opening.

Further embodiments follow from the dependent claims.

BRIEF EXPLANATION OF THE FIGURES

The invention is to be explained in more detail below with reference to exemplary embodiments in connection with the drawings, in which.

WAYS OF IMPLEMENTING THE INVENTION

Figure 1:
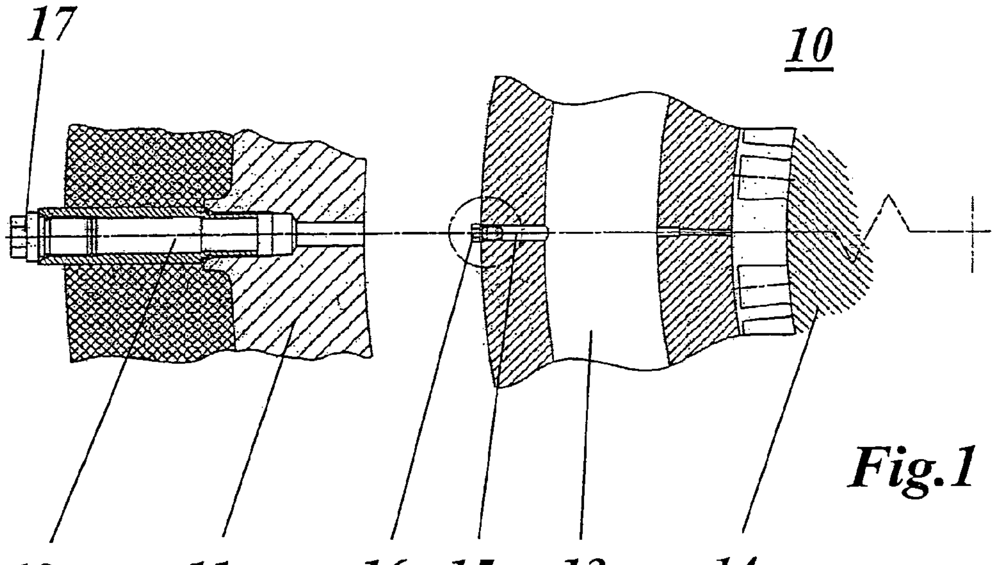
FIG. 1 shows the configuration of a gas turbine in cross section, with inner part and casing and inspection ports, which are closed by sealing plugs.
Figure 2:
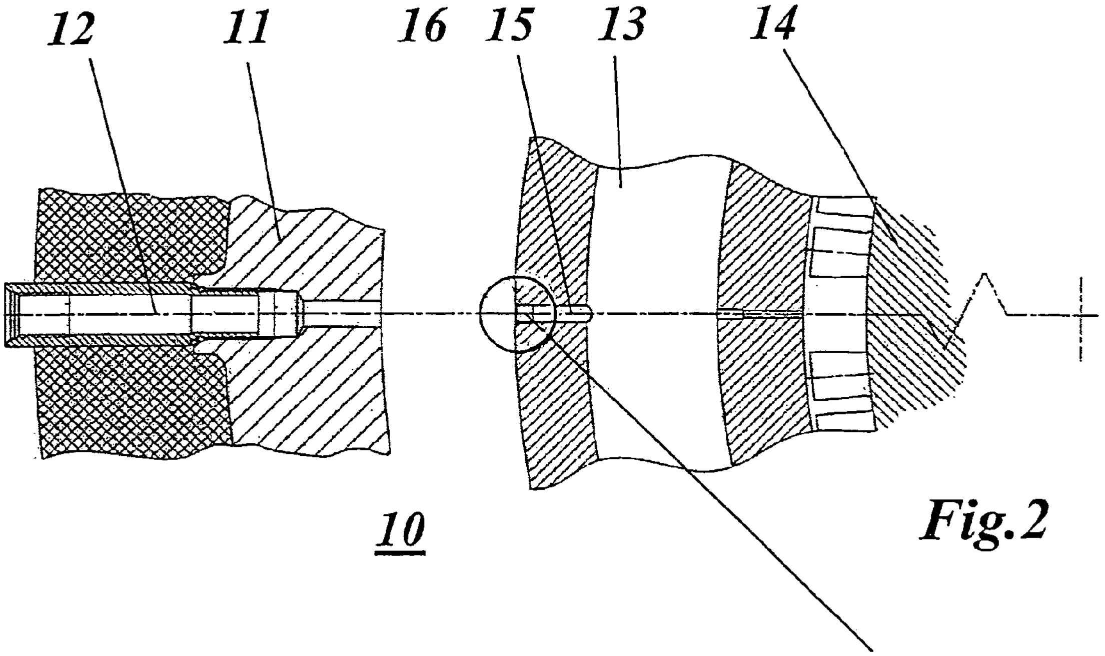
FIG. 2 shows the gas turbine from FIG. 1 with unscrewed sealing plugs.
Figure 3:
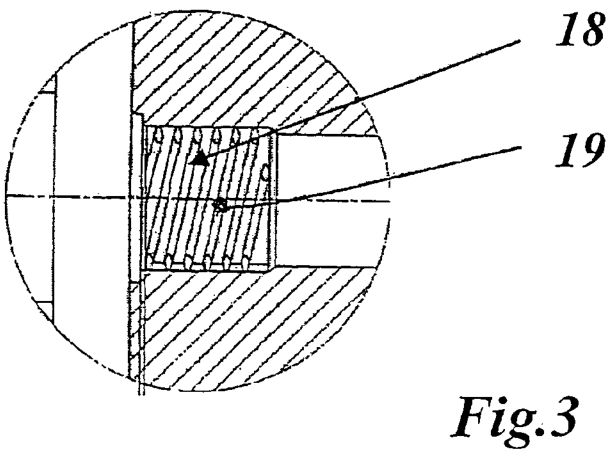
FIG. 3 shows an enlarged detail of the threaded insert in the inspection port in the inner part from FIG. 2.

The configuration of a large turbine, as is suitable in particular as a place of use for the method and installation tool according to the invention, is shown in details in FIGS. 1 to 3. The gas turbine 10 comprises an inner part 13 with a rotor 14 inside. The inner part 13 is arranged inside a casing 11. Inspection ports 12 and 15, respectively, which are in alignment with one another and are in the form of through-holes are provided at various locations in both the casing 11 and the inner part 13, through which inspection ports 12 and 15 components located in the interior of the gas turbine 10, such as turbine blades for example, can be inspected. The inspection ports 12, 15 can be sealed by sealing plugs 16, 17 which can be screwed into corresponding sealing threads at the entrances of the inspection ports 12, 15. A problem in this case is in particular the sealing thread 18 shown in FIGS. 2 and 3 at the entrance of the inspection port 15 arranged in the inner part 13. A spiral threaded insert 19 of Helicoil® type, which has to be exchanged in the event of damage, is inserted (screwed) into this sealing thread 18.

The method and the installation tool according to the invention are provided for the installation of such a threaded insert 19 accessible from outside only through the inspection port 12.

Figure 4:
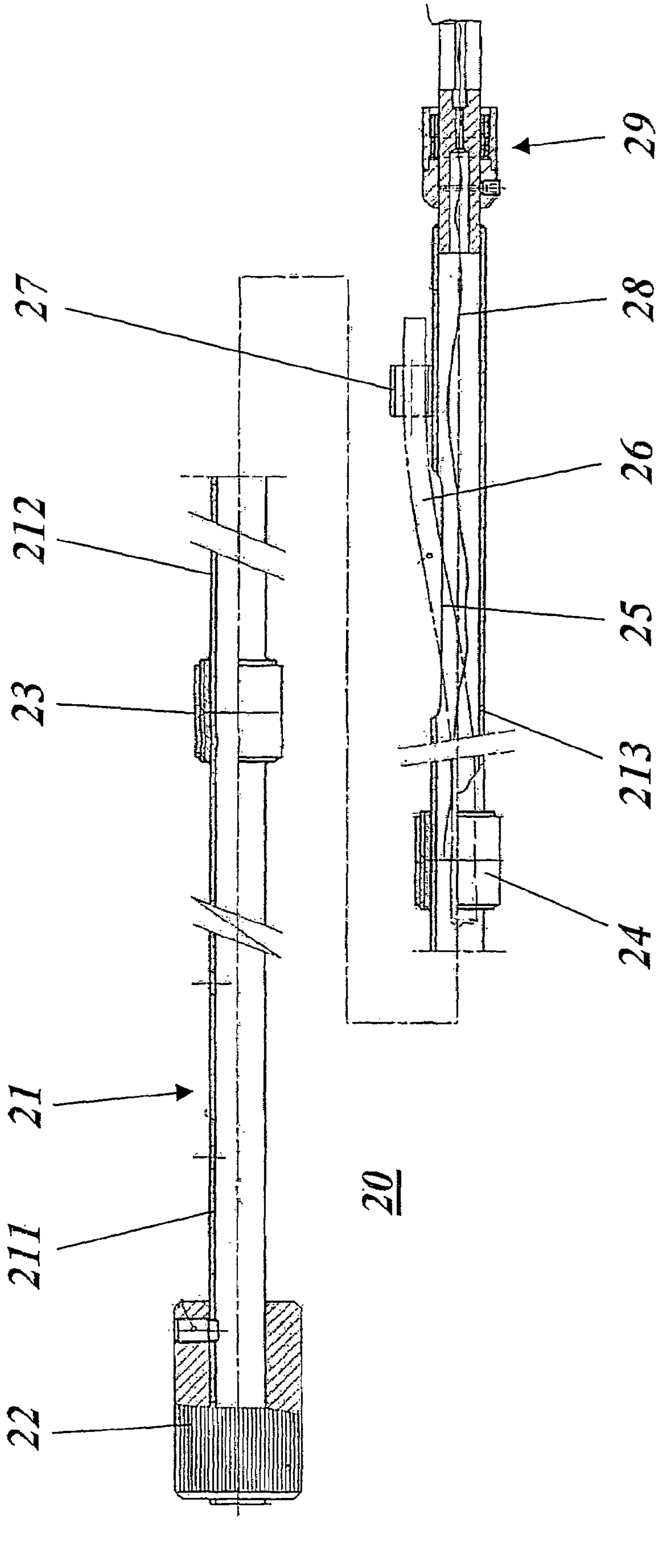
FIG. 4 shows a preferred exemplary embodiment for an installation tool according to the invention in a partial longitudinal section.

A preferred exemplary embodiment of an installation tool according to the invention is shown as an entity in FIG. 4 in partial longitudinal section. The front part of the installation tool from FIG. 4, which front part accommodates the threaded insert to be installed, is reproduced on an enlarged scale in FIG. 5. The installation tool 20 comprises a tubular shaft 21 which is composed of a plurality of sections 211, 212, 213 and to the rear end of which a handle 22 provided with fluting is attached, with which handle 22 the installation tool 20, as with a rotary grip, can be rotated about its longitudinal axis. The sections 211, 212 and 213 are releasably connected to one another by screwed couplings 23, 24. The installation tool 20 can be shortened in length by omitting the center section 212. The releasably fastened handle 22 can be fixed on the section 211 in different axial positions. The three sections 211, 212 and 213 have, for example, a length of 500 mm each, resulting in an overall length of more than 1500 mm when all three sections are used for the installation tool 20.

The actual head 29 of the installation tool 20 is attached to the front end of the third section 213, this head 29 accommodating the threaded insert to be installed. The head 29, shown enlarged in FIG. 5, comprises a circular-cylindrical bolt 30 having a central through-hole 35. The bolt 30 has a slotted section 36 in the front region. The outside diameter of the bolt 30 is dimensioned in such a way that a threaded insert to be installed can be pushed over the slotted section 36 from the front without any problems (see threaded insert 38 in FIGS. 8, 9). In the process, the transverse driving tang 40 present on the threaded insert 38 is accommodated by the slot 39 in the slotted section 36.

The bolt 30 of the head 29 is enclosed concentrically by a mounting sleeve 32 at a predetermined distance apart, this mounting sleeve 32 having an internal thread in its rear region. The mounting sleeve 32 is welded to an annular retainer 31 which is seated on the bolt 30 in a rotatable manner and can be fixed on the bolt 30 in a desired rotary angle position by means of a locking screw 34. The axial position of the mounting sleeve 32 is fixed by the point of the locking screw 34 engaging in an annular groove 37 on the bolt 30.

The intermediate space between the mounting sleeve 32 and the bolt 30 is largely occupied by a threaded insert 33 which is identical to the threaded insert 38 to be installed and is screwed into the internal thread of the mounting sleeve 32. The screwed-in threaded insert 33 serves to orient the threaded insert 38 to be installed on the head 29 of the installation tool 20. Additional lateral guidance of the threaded insert 38 is achieved by the mounting sleeve 32 extending beyond the front end of the screwed-in threaded insert 33 by a minimum distance of, for example, 2 mm.

Figure 6:
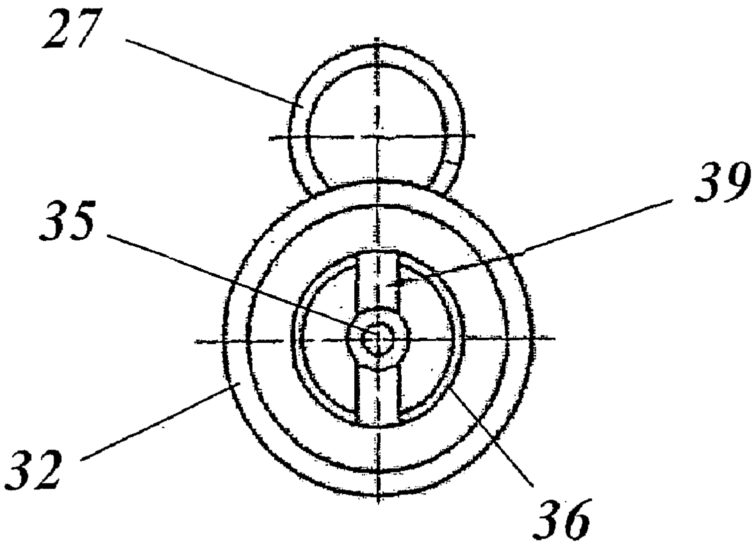
FIG. 6 shows the front view of the installation tool according to FIG. 4.

So that the installation operation and the precise installation location can be observed and controlled by the user of the installation tool 20 when the latter is being used in the cases shown in FIGS. 1 to 3 or in similar cases, the installation tool 20 is prepared for the use of an optical probe in the form of a borescope 26. The borescope 26 is passed forward through the hollow interior of the shaft 21 and comes out through a slot-shaped opening 25 in the foremost section 213. A short supporting tube 27, through which the front end of the borescope 26 is passed, is attached on the outside of the section 213 in front of the opening 25 (also see FIG. 6). Optical orientation of the borescope 26 to the installation point is obtained by means of the supporting tube 27 when the installation tool 20 is advanced with its head 29 to the installation location. In this case, the borescope 26 preferably lies in the same plane as the slot 39 of the bolt 30, i.e. where the threaded insert 38 has to engage in the prepared thread groove of, for example, the inner part 13.

Figure 8:
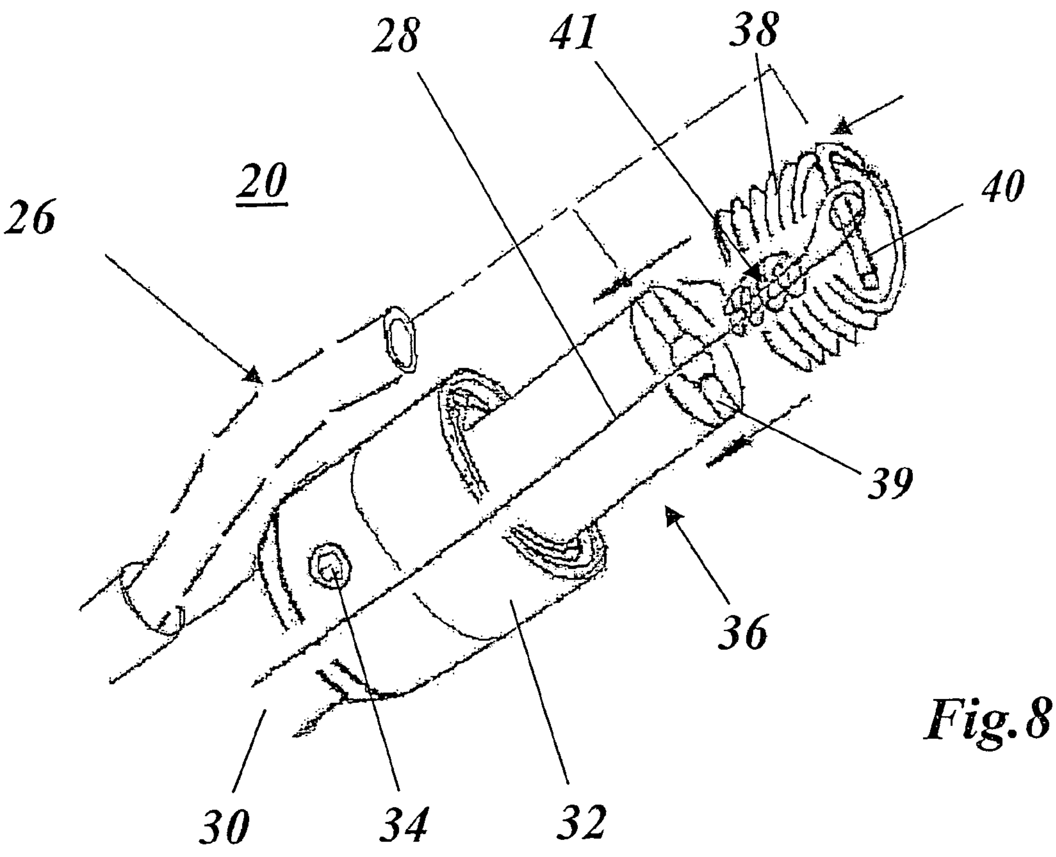
FIGS. 8 and 9 show two different phases during the insertion and securing of the threaded insert to be installed in the installation tool from FIG. 4 or 5.
Figure 9:
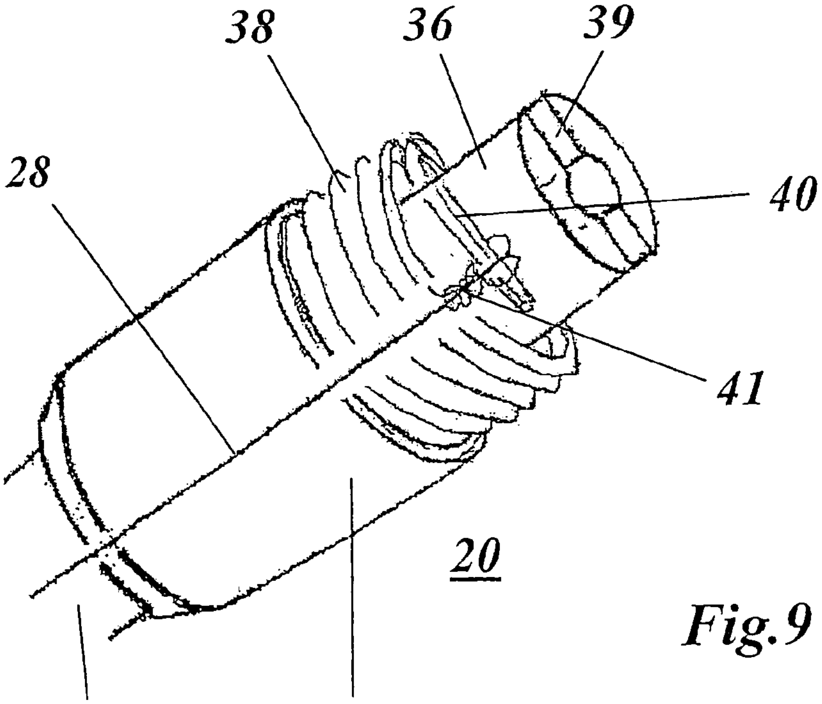

As can be seen from FIGS. 8 and 9, the threaded insert 38 to be installed is pushed loosely over the slotted section 36 of the bolt 30 at the head 29 of the installation tool 20, the driving tang 40 being accommodated by the slot 39. So that the threaded insert 38 cannot slip or fall off from the bolt 30 even in an unfavorable position of the installation tool 20, securing means for the threaded insert 38 are provided on the installation tool 20. In the exemplary embodiment, the securing means comprise a securing thread 28 which is passed forward in the interior of the shaft 21 and runs through the through-hole 35 in the head 29 and comes out at the front in the slotted section 36. The securing thread is, for example, a nylon thread having a diameter of 0.4 mm. The front end of the securing thread 28 is fastened to the driving tang 40 of the threaded insert 38 by means of a knot 41 (FIGS. 8, 9). If the securing thread 28 is pulled sufficiently tight out of the installation tool 20 toward the rear, the threaded insert 38 is secured on the head 29. In addition, the driving tang 40 itself is secured and can be safely pulled out together with the installation tool if—as intended—it has been broken off from the threaded insert 38 after the installation of the threaded insert 38.

The method of installing the threaded insert 38, after the old threaded insert has been removed, takes place in the following steps:

Step 1: first of all the thread into which the threaded insert 38 is to be screwed is retapped. This ensures that the thread for the new threaded insert is clean.

Figure 7:
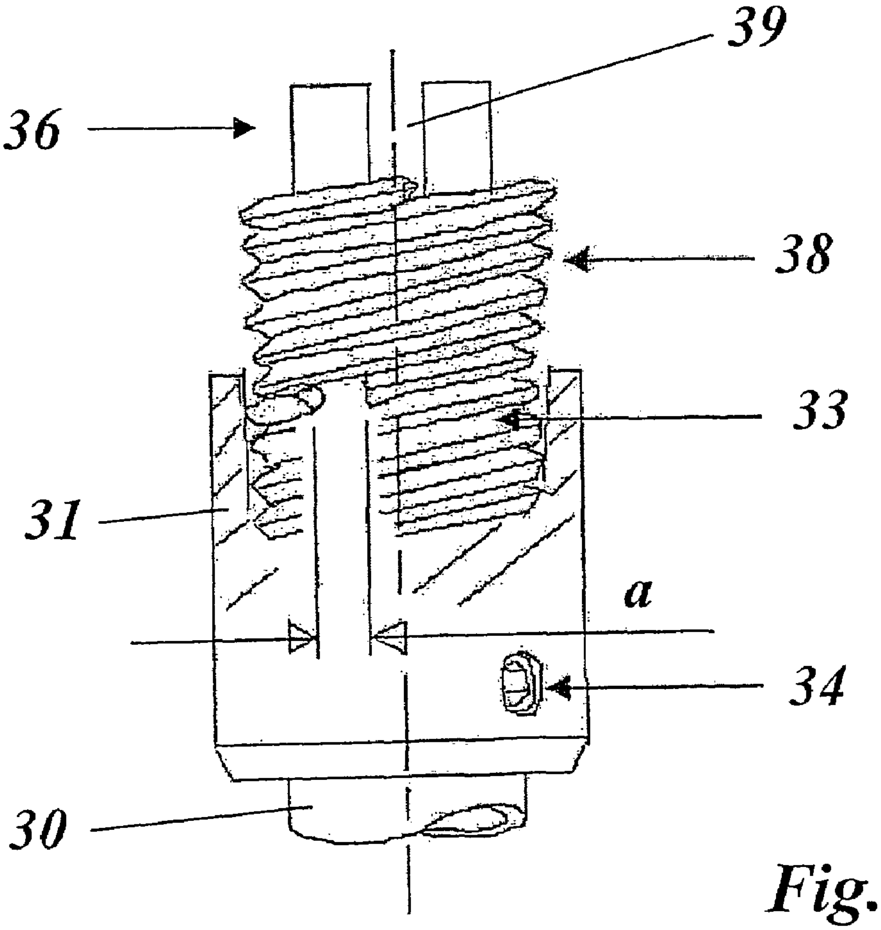
FIG. 7 shows the positioning of the threaded insert to be installed on the head of the installation tool from FIG. 5 by means of a second threaded insert of the same type arranged firmly in the head.

Step 2: the new threaded insert 38 is put onto the head 29 of the installation tool 20, the driving tang 40 being in alignment with the borescope 26. The rotary angle position of the mounting sleeve 32 with the screwed-in threaded insert 33 is now adjusted by means of the locking screw 34 in such a way that—as shown in FIG. 7—a distance a of about 5 mm is obtained between the end of the threaded insert 38 to be installed and the start of the screwed-in threaded insert 33.

Step 3(a): the new threaded insert 38 is fastened—as can be seen in FIGS. 8 and 9—to the securing thread 28 of 0.4 mm nylon® by means of a knot 41, preferably in the form of a hangman's knot. The securing thread 28 has two functions: firstly, it holds the threaded insert 38 on the installation tool 20 during the insertion of the installation tool. Secondly, it permits the safe removal of the driving tang 40 after the latter has been broken off from the threaded insert 38. The knot 41 should if possible be placed in the center of the driving tang 40 and be tied as firmly as possible (see FIG. 9).

Step 3(b): the securing thread 28 is passed through the head 29 or the through-hole 35 of the installation tool 20, in the course of which, for example, use can be made of a welding wire or the like. The new threaded insert 38 on the head 29, is brought, as in step 2, into a position in which the driving tang 40 is in alignment with the borescope 26. The sections 211, 212 and 213 of the installation tool are then screwed together according to FIG. 4, the securing thread 28 being passed through all the sections. The securing thread 28 is then tightened with slight pressure, so that the threaded insert 38 remains fixed on the head 29. The rest of the securing thread 28 can be wound around the handle 22. The installation tool 20 can be assembled as required in three different lengths, depending on which sections are used.

Figure 5:
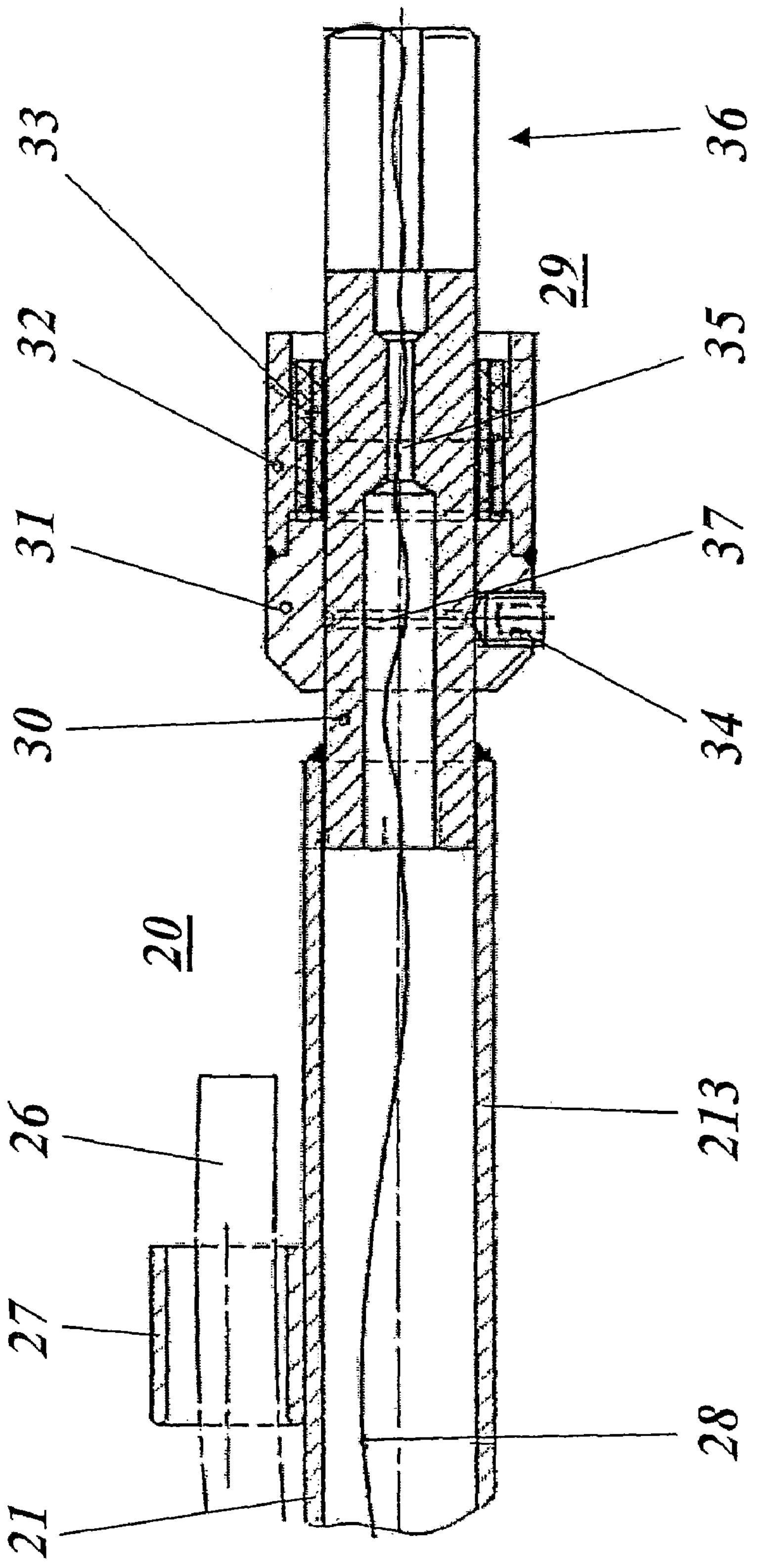
FIG. 5 shows the head of the installation tool according to FIG. 4 in an enlarged representation.

Step 4: in order to facilitate the installation of the threaded insert 38, the borescope 26 is passed through the shaft 21 and mounted with the front end in the supporting tube 27 (see FIGS. 4 and 5). The supporting tube 27 is oriented in such a way that the start of the threaded insert 38 is within the field of view. In this way, the insertion of the threaded insert 38 into the associated tapped hole can be optically monitored.

Step 5: the installation tool 20 is then inserted into the corresponding inspection port at the gas turbine (or a comparable access opening in another application). By means of the borescope 26, the threaded insert 38 is brought into the position in front of the associated tapped hole. The threaded insert 38 is then first of all screwed in with half a turn. The borescope 26 is then pulled out of the installation tool 20. The threaded insert 38 is then screwed in further, the number of turns (e.g. 7) being counted at the same time, until the final installation position is reached. The securing thread is then slackened and the installation tool is pulled a certain distance (e.g. 50 mm) out of the inspection port, rotated by 90° and thrust briefly into the inspection port in order to break off the driving tang 40 on the threaded insert 38. The installation tool 20 can finally be pulled out of the inspection port and the broken-off driving tang 40 on the securing thread 28 can be brought out. The position of the screwed-in threaded insert 38 can be optionally checked by the borescope 26 being inserted again before the driving tang 40 is broken off, and by the position of the threaded insert in the tapped hole being optically inspected.

On the whole, the invention results in a method and a tool for installing a threaded insert, in particular at inaccessible locations, which are distinguished by the following characteristic features and advantages:

The threaded insert is fixed to the tool and secured until it is screwed into the associated tapped hole. The installation tool can therefore be used in any position without having to worry about the threaded insert falling off or being lost in the interior of the gas turbine.

The driving tang of the screwed-in threaded insert can be safely removed after being broken off. The driving tang is held by the securing thread until the installation tool has been pulled out of the machine.

The new threaded insert is located in the correct position relative to the associated tapped hole, so that it can be easily screwed in without tilting. This is achieved by the threaded insert 33 of the same type which is firmly installed in the tool and provides an exact orientation surface for the threaded insert to be screwed in. The installation tool permits the use of a borescope for the facilitated positioning of the tool and alignment with the tapped hole.

LIST OF DESIGNATIONS

| | |
|---|---|
| 10 | Gas turbine |
| 11 | Casing |
| 12, 15 | Inspection port |
| 13 | Inner part |
| 14 | Rotor |
| 16, 17 | Sealing plug (screw-in) |
| 18 | Sealing thread |
| 19, 33, 38 | Threaded insert |
| 20 | Installation tool |
| 21 | Shaft (tubular) |
| 22 | Handle |
| 23, 24 | Screwed coupling (extension) |
| 25 | Opening (slot-shaped) |
| 26 | Borescope |
| 27 | Supporting tube (borescope) |
| 28 | Securing thread (e.g. of nylon ®) |
| 29 | Head (installation tool) |
| 30 | Bolt |
| 31 | Retainer |
| 32 | Mounting sleeve |
| 34 | Locking screw |
| 35 | Through-hole |
| 36 | Slotted section |
| 37 | Annular groove |
| 39 | Slot |
| 40 | Driving tang |
| 41 | Knot |
| 211, 212, 213 | Section (shaft) |
| a | Distance |

The invention claimed is:

1. A method of installing spiral threaded inserts, each threaded insert having a driving tang with a securing thread, the method comprising:

inserting a first threaded insert into an installation tool;

securing the first threaded insert in the installation tool with the securing thread to prevent the insert from falling out; and screwing the first threaded insert into a tapped hole with the installation tool;

cutting off the driving tang from the first threaded insert after securing the first threaded insert; and removing the cut-off driving tang from the installed first threaded insert with the securing thread.

2. The method as claimed in claim 1, further comprising:

placing the first threaded insert in a predetermined installation position during the insertion into the installation tool.

3. The method as claimed in claim 2, further comprising:

firmly arranging a second threaded insert in the installation tool; and orienting the first threaded insert to be installed, during insertion into the installation tool, at said second threaded insert relative to the predetermined installation position.

4. The method as claimed in claim 1, further comprising:

moving the first threaded insert through an inspection port; and optically monitoring the first threaded insert.

5. The method as claimed in claim 4, wherein monitoring comprises monitoring with a borescope.

6. An installation tool for installing spiral threaded inserts, the tool comprising:

a single shaft having a first end including first means for receiving a first threaded insert over said first means, second means at said first means for anti-rotation retention and guidance of said first threaded insert, and third means for securing the first threaded insert on said first means.

7. The installation tool as claimed in claim 6, wherein the first means comprises a head having an elongated circular-cylindrical bolt, which bolt has, at a front end, a slotted section for pushing the first threaded insert over the bolt.

8. The installation tool as claimed in claim 7, further comprising:

a hollow-cylindrical mounting sleeve having an internal thread;

a second threaded insert; and wherein, below the slotted section, the bolt is enclosed concentrically by the hollow-cylindrical mounting sleeve at a distance apart, the second threaded insert is firmly screwed into the hollow-cylindrical mounting sleeve internal thread so that the first threaded insert pushed over the slotted section abuts at an end face against the second threaded insert and is oriented at the second threaded insert.

9. The installation tool as claimed in claim 8, wherein the first and second threaded inserts are of the same type.

10. The installation tool as claimed in claim 8, wherein the mounting sleeve is configured and arranged to be rotatable about the bolt and to be fixed in any desired rotary angle position.

11. The installation tool as claimed in claim 10, further comprising:

fixing means for rotationally fixing the mounting sleeve to the bolt.

12. The installation tool as claimed in claim 6, wherein the second means comprises a securing thread which is longitudinally passed through the installation tool, is led out of the installation tool at a front end of the installation tool, and can be connected to the first threaded insert.

13. The installation tool as claimed in claim 12, wherein the first means comprises a head having an elongated circular-cylindrical bolt, which bolt has, at a front end, a slotted section for pushing the first threaded insert over the bolt, the bolt including a central through-hole, and the securing thread passes through the central through-hole.

14. The installation tool as claimed in claim 13, wherein the securing thread is made of a tear-resistant material and has a diameter of about 0.4 mm.

15. The installation tool as claimed in claim 6, wherein the shaft comprises a plurality of tubular sections arranged one behind the other and releasably connected to one another.

16. The installation tool as claimed in claim 15, further comprising:

a slot-shaped opening extending in the longitudinal direction in a foremost section of the shaft, through which slot-shaped opening a borescope when running inside the shaft can be passed outward; and a supporting tube, for supporting the borescope when projecting from the shaft, arranged on the outside of the foremost section in front of the opening.

17. The installation tool as claimed in claim 6, further comprising:

a driving tang arranged on the first threaded insert, configured and arranged to be cut off; and third means for securing the driving tang.

18. The installation tool as claimed in claim 17, wherein the second means comprises the third means.

19. A method of installing spiral threaded inserts, the method comprising:

inserting a first threaded insert into an installation tool including pushing the first threaded insert over a receiver;

securing the first threaded insert with separate securing means in the installation tool to prevent the insert from falling from said receiver; and screwing the first threaded insert into a tapped hole with the installation tool.

20. The method as claimed in claim 19, wherein the threaded insert has a driving tang, wherein securing comprises securing the first threaded insert in the installation tool with the securing means on the driving tang to prevent the first threaded insert from falling out, and further comprising:

cutting off the driving tang from the first threaded insert afler securing the first threaded insert.

21. The method as claimed in claim 20, wherein the securing means comprises a securing thread, wherein securing comprises securing the first threaded insert in the installation tool with the securing thread, and further comprising:

removing the cut-off driving tang from the installed first threaded insert with the securing thread.

22. The method as claimed in claim 21, further comprising:

placing the first threaded insert in a predetermined installation position during the insertion into the installation tool.

23. The method as claimed in claim 22, further comprising:

firmly arranging a second threaded insert in the installation tool; and orienting the first threaded insert to be installed, during insertion into the installation tool, at said second threaded insert relative to the predetermined installation position.

24. The method as claimed in claim 19, further comprising:

moving the first threaded insert through an inspection port; and optically monitoring the first threaded insert.

* * * * *